United States Patent Office
3,684,705
Patented Aug. 15, 1972

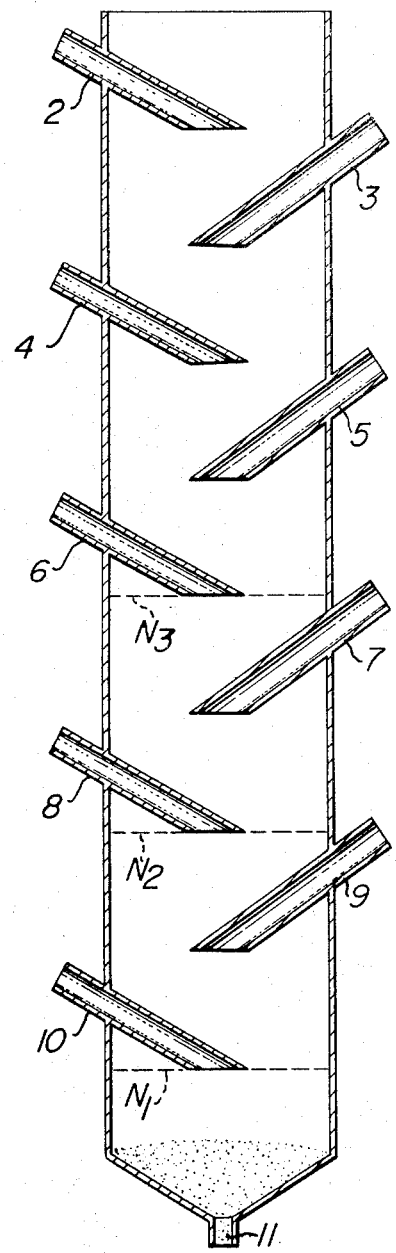
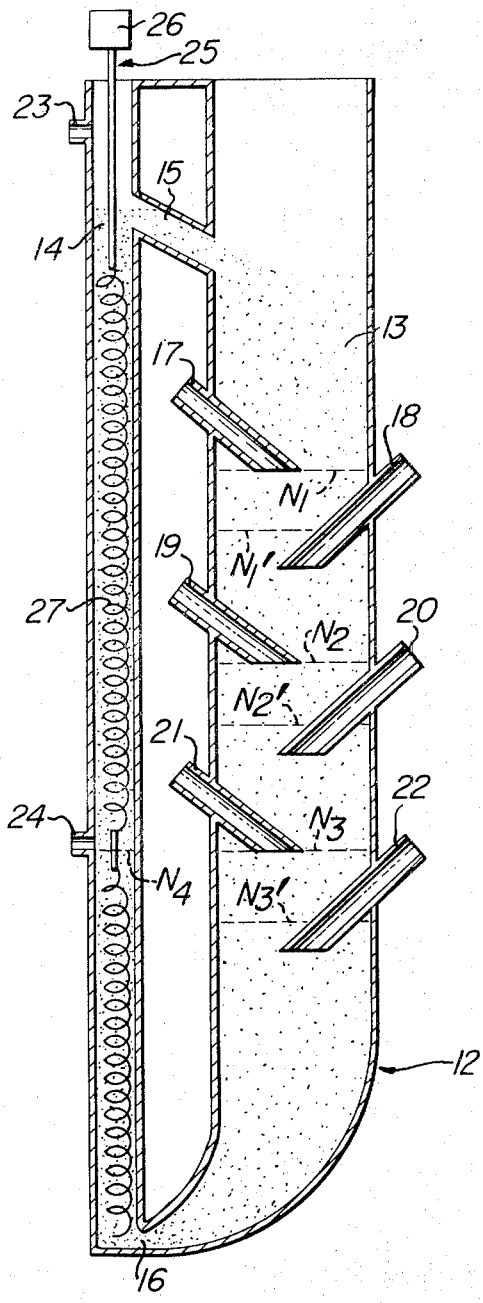

3,684,705
MATERIAL ELUTING METHOD AND
APPARATUS
Tetsuo Matsumoto, 411 Honjo, Harimacho, Kako-gun,
Hyogo-ken, Japan
Filed June 4, 1970, Ser. No. 43,392
Claims priority, application Japan, June 6, 1969,
44/44,955
Int. Cl. B01d 15/08
U.S. Cl. 210—31 C                    15 Claims

ABSTRACT OF THE DISCLOSURE

Materials are separated by means of carriers consisting of a porous material having cross-linked pores by allowing the carriers to pass through a plurality of interfaces between a plurality of liquids and fall through said plurality of the liquids, and separating the material present in said liquids from the carriers owing to a difference in flow resistance of the materials to said cross-linked pores.

This invention relates to a method and an apparatus for eluting materials, and more particularly relates to a method and an apparatus for separating or eluting materials by transferring carriers consisting of a porous material having cross-linked pores through a plurality of stagnant liquids and separating materials present in said stagnant liquids owing to a difference in flow resistances of the materials to said cross-linked pores.

Screening of solution components by gel filtration is based on a difference in resistances of the components passing through pores of a porous material when some component passes through a liquid in which the porous material is dispersed, and the degree of the resistances depends upon the sizes and shapes of the molecules. Thus, the flow velocities of the passing components are different, depending upon the kind of the components. That is, these features are utilized in the gel filtration method.

According to the conventional column chromatography based on said gel filtration method, a predetermined amount of a porous material is filled and fixed in a specific column and a predetermined amount of a sample is passed through the column to effect screening of the components. When the operation is finished, the porous material is activated, and filled and fixed in the column again for reuse. Accordingly, the separation of the solution components cannot be carried out efficiently, and much labor and time are required for filling, fixing and activation of the porous material. These are disadvantages of the conventional column chromatography.

An object of the present invention is to provide a method and an apparatus for eluting materials having none of such disadvantages.

Another object of the present invention is to provide a method and an apparatus for eluting materials, which are suitable for separation or elution of materials.

Another object of the present invention is to provide a method and an apparatus for eluting materials, which can continuously perform separation or elution.

According to a preferable embodiment of the present invention, an interface is formed between at least two kinds of liquids. Carriers consisting of a porous material having cross-linked pores are allowed to pass through said interface to move from one of said two kinds of the liquids towards another. Materials present in said another liquid are separated as elution bands in said another liquid in the course of transfer of the carriers owing to a difference in migration distance, which is due to a difference in the resistances of said materials to said cross-linked pores.

Other objects and features of the present invention will be clear from the following description, referring to the accompanying drawings.

FIG. 1 is a schematic, cross-sectional, elevation view of one embodiment of an apparatus for carrying out the present method.

FIG. 2 is a schematic, cross sectional, elevation view of another embodiment of the apparatus.

Figure 3:
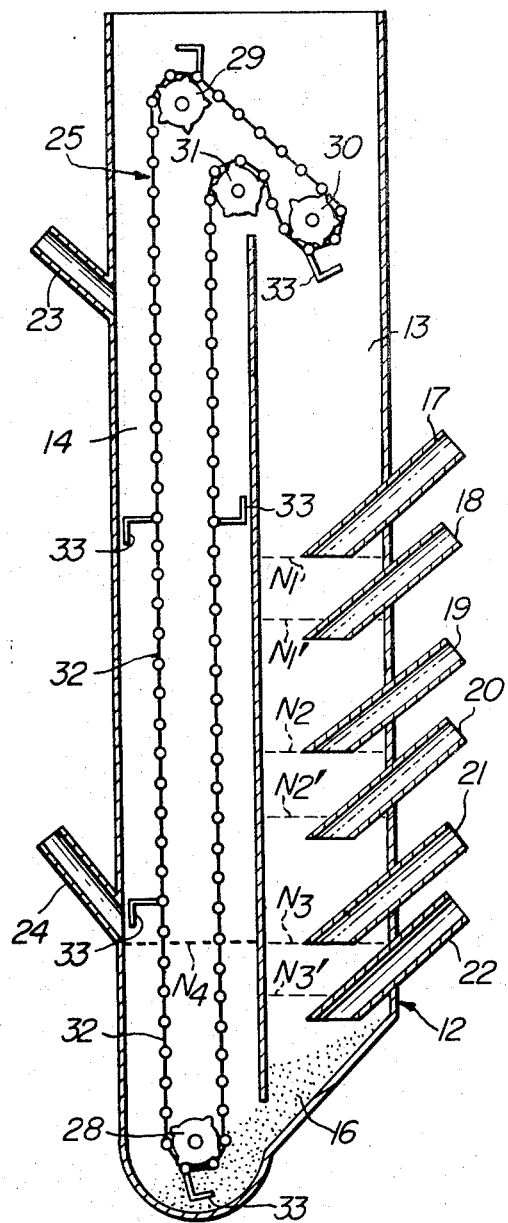
FIG. 3 is a schematic, cross-sectional, elevation view of further embodiment of the apparatus.

In FIG. 1, an embodiment of an apparatus for carrying out the present method for eluting materials is shown.

A cylinder 1 having an open top end and a closed bottom end is provided with the first outlet pipe 2, the first inlet pipe 3, the second outlet pipe 4, the second inlet pipe 5, the third outlet pipe 6, the third inlet pipe 7, the fourth outlet pipe 8, the fourth inlet pipe 9 and the fifth inlet pipe 10 along the side wall from the top downwards, and further provided with the final outlet 11 at the bottom. Said pipes are all extended into the cylinder, and each pipe is properly inclined so that the extended pipe end may be positioned lower than the extended pipe end of the adjacent upper pipe. The end face of the extended pipe is perpendicular to the vertical axis of the cylinder 1.

Basic principle of the present invention will be explained hereunder, prior to the description of an example based on the apparatus shown in FIG. 1.

The first liquid and the second liquid that has different properties, such as concentration, pH, specific gravity, etc. from those of the first liquid, are filled in a vessel, a cylinder or a liquid tank to form an interface between the first liquid and the second liquid. Now, it is assumed that the first liquid is above the interface and the second liquid is below the interface. When carriers consisting of a porous material, for example, cross-linked, insoluble dextrane, etc. are allowed to pass from the first liquid to the second liquid through the interface in that state, and if a material A having a larger flow resistance to the cross-linked pores of the carrier, a material B having a smaller resistance and a material C having no resistance are dissolved in the second liquid, the material A migrates a longer distance, the material B migrates a shorter distance and the material C undergoes no migration, that is, the material C is kept in a standstill state, with the transfer of the carriers. Thus, an elution or separation zone of the material C is formed between the interface formed between the first and second liquids (which will be hereinafter referred to "the first position or interface") and the second position or interface at some distance from the first position or interface, and an elution zone of the materials C and B is formed between the second position or interface and the third position or interface at some distance from the second position or interface. A zone of the materials A, B and C is formed below the third position or interface. Thus, eluted materials can be withdrawn from the respective positions or interfaces through outlet pipes to the outside of the cylinder.

When the carriers reach the inside of the second liquid from the first liquid through the interface between the first liquid and the second liquid, the first liquid filled in the cross-linked pores of the carrier is disengaged from the cross-linked pores and the second liquid enters into the cross-linked pores. That is to say, when the carriers reach the second liquid, the first liquid is exchanged with the second liquid within the cross-linked pores of the carriers. As a result, the level of the interface formed between the first liquid and the second liquid is a little lowered. However, the interface of the material C, that is, the first interface, is not changed.

When the eluted material is taken out of the cylinder 1 at the interface, the level of the interface formed between the first liquid and the second liquid is lowered. However, such lowering of the level can be readily prevented by making up the second liquid in an amount at least equal to that of the reduced second liquid. The carriers can be transferred according to a gravity sedimentation method, a transfer method based on controlling of the carriers by a carrier-circulating mechanism, which will be described later, or a forced transfer method by centifuge, etc.

An example of the present invention using an apparatus of FIG. 1 on the basis of said principle will be given below.

EXAMPLE 1

An example of removing ammonium sulfate from a xanthine oxidase liquor by using cross-linked, insoluble dextrane (G50, finely small particle size) and exchange solvents from a pyrophosphate buffer solution to a phosphate buffer solution:

An aqueous sodium chloride solution (1.0 M) is charged into a cylinder 1 through the fifth inlet pipe 10; a xanthine oxidase liquor containing a pyrophosphate buffer solution (0.1 M, pH 8.3) and ammonium sulfate through the fourth inlet pipe 9; a phosphate buffer solution (0.1 M, pH 7.0) through the third inlet pipe 7; water through the second inlet pipe 5. Interfaces $N_1$, $N_2$ and $N_3$ are formed between pairs of these liquids. Then, cross-linked, insoluble dextrane carriers dispersed in water were charged into water in the cylinder through the first inlet pipe 3 and allowed to settle. The phosphate buffer solution layer and the pyrophosphate buffer solution layer containing ammonium sulfate move towards the settling direction of the carriers owing to a difference in flow resistances of the molecules in the respective liquids to the cross-linked pores of the carriers, while the xanthine oxidase liquor layer undergoes no migration and thus exists along said two liquid layers. That is to say, phosphates, ammonium sulfate and pyrophosphates have almost equal flow resistances to the cross-linked pores of the carrier and thus the respective solution components are transferred together with the settling carriers. However, the xanthine oxidase molecule is so lage that it cannot enter into the cross-linked pores and thus it remains at the original position of the liquid layer, irrespective of the settling cariers. As a result, the initial interface between the phosphate buffer solution and the xanthine oxidase liquor containing ammonium sulfate and the pyrophosphate buffer solution as a solvent is separated into two interfaces. The first interface is the one between the phosphate buffer solution and the xanthine oxidase liquor containing the phosphate buffer solution, that is, the interface formed at the initial stage which corresponds to the interface $N_2$. The second interface is the one between the xanthine oxidase liquor containing the phosphate buffer solution as a solvent and the xanthine oxidase liquor containing ammonium sulfate and the pyrophosphate buffer solution as a solvent, and is formed at a position dislocated from the first interface $N_2$ towards the settling direction of the carriers. Accordingly, the desired solution of xanthine oxidase containing the phosphate buffer solution as a solvent can be withdrawn from the first interface, that is, the original level of the interface $N_2$ through the fourth outlet pipe 8.

To carry out said operation continuously in a large amount, the respective liquids are charged at flow rates per unit time of $V_5$, $V_7$, $V_9$ and $V_{10}$ into the cylinder 1 through the second, third, fourth and fifth inlet pipes 5, 7, 9, and 10, respectively and the respective liquids are withdrawn at flow rates per unit time of $V_2$, $V_4$, $V_6$, $V_8$ and $V_{11}$ from the cylinder 1 through the first, second, third and fourth outlet pipes 2, 4, 6, and 8 and the final outlet 11, respectively, while satisfying the following conditions.

$$\left.\begin{array}{l} V_5 \approx V_4 \\ V_7 \approx V_6 \\ V_9 \approx V_8 \\ V_3 + V_{10} \approx V_{11} + V_2 \end{array}\right\} \quad (1)$$

As a result, a solution of xanthine oxidase can be readily exchanged in a large amount from the pyrophosphate buffer solution containing ammonium sulfate to the phosphate buffer solution.

The carriers settled at the bottom of the cylinder 1 are withdrawn from the final outlet 11.

The present invention has been explained, referring to the embodiment of FIG. 1. Advantages of the present invention obtainable throughout the embodiment of FIG. 1 can be summarized as follows:

(1) In the well-known, conventional chromatography, the amount of carriers as a stationary phase is limited, and separation or elution cannot be efficiently carried out Furthermore, much labor and time are required for filling and activating the stationary phase. On the other hand, in the present invention, the stationary phase is a liquid and the moving phase is solids. Thus, none of such problems is encountered at all in the present invention.

(2) Separation or elution of the materials can be carried out continuously or discontinuously.

(3) In the continuous separation, it is desirable to keep the interface at a substantially constant level, and such can be attained by adjusting the volumes of the liquids introduced and withdrawn per unit time. That is, such can be attained by using, firstly, pumps which will meet said conditions (1), and, secondly, by detecting the level and state of the interface by any of the following methods to control and actuate the pumps according to the detected information, whereby the interface can be maintained at the desired level.

The detection of the level and state of the interface is performed, for example, by a method for measuring an electromotive force, by a method for measuring an electric resistance, by a method for measuring an electric conductivity, by a polarographic method, by a method for measuring a specific gravity, by a method for measuring a light absorbance, by a method for measuring a light reflexion, by a method for measuring a light refraction, by the method for measuring an osmotic pressure, etc.

In FIG. 2, another embodiment of an apparatus for carrying out the present method for eluting the materials is shown. A liquid vessel 12 of modified U-tube consists of the first compartment 13 and the second compartment 14, which are communicated with each other through a connecting tube 15 at the top part and a connection 16 at the bottom. The first compartment 13 is provided with an outlet tube 17, an inlet tube 18, an outlet tube 19, an inlet tube 20, an outlet tube 21 and an inlet tube 22 at the side wall successively from the top downwards. These pipes are arranged in the same manner as shown in FIG. 1, and are inclined. The second compartment 14 is provided with an inlet pipe 23 at the top and an outlet pipe 24 at the lower part. In the second compartment 14, a carrier-circulating mechanism 25 is provided. This mechanism is in such a structure as that of the well-known slurry pump, and consists of a motor 26 and a screw 27 which is rotatable by said motor.

Action of this embodiment will be hereunder explained, referring to an example where ammonium sulfate is removed from a xanthine oxidase liquor, and the buffer solution is exchanged from the pyrophosphate solution (0.1 M, pH 8.3) to the phosphate (0.1 M, pH 7.0).

EXAMPLE 2

In FIG. 2, an aqueous sodium chloride solution (1.0 M) is charged into the first compartment 13 through the inlet pipe 22; a xanthine oxidase liquor containing ammonium sulfate and a pyrophosphate buffer solution (0.1 M, pH 8.3) as a solvent through 20; a phosphate buffer solution (0.1 M, pH 7.0) through 18; and water through 23, whereby an interface $N_1$ between water and the phosphate buffer solution (0.1 M, pH 7.0) is formed, the interface $N_2$ between the phosphate buffer solution (0.1 M, pH 7.0) and the xanthine oxidase liquor containing ammonium sulfate and the pyrophosphate buffer solution (0.1 M, pH 8.3) as a solvent, and an interface $N_3$ between the xanthine oxidase liquor containing ammonium sulfate and the pyrophosphate buffer solution (0.1 M, pH 8.3) as a solvent and the aqueous sodium chloride solution (1.0 M) are formed in the first compartment 13. In the second compartment, an interface between water and the aqueous sodium chloride solution is formed. When a proper amount of cross-linked, insoluble dextrane (Sephadex G50, very fine particle sizes) is supplied from the top of the first compartment 13 as carriers, the cross-linked, insoluble dextrane is settled down in the compartment. Owing to the property which allows such smaller molecules as water, a phosphate, a pyrophosphate, ammonium sulfate, sodium chloride, to enter into the cross-linked pores in the course of settling, movement of the smaller molecules is brought about with the transfer (settling) of the cross-linked, insoluble dextrane. As a result, the levels of the respective interfaces $(N_1)$, $(N_2)$ and $(N_3)$ of water, phosphate (0.1 M, pH 7.0), pyrophosphate containing ammonium sulfate (0.1 M, pH 8.3), and sodium chloride (1.0 M) are moved to the levels of $(N_1')$, $(N_2')$ and $(N_3')$, respectively, but the xanthine oxidase is sufficiently larger in size than the cross-linked pores and cannot enter into the cross-linked pores of the carriers. Thus, the xanthine oxidase remains at the original position, that is, the interface $(N_2)$ is still formed by xanthine oxidase solution, irrespective of the transfer of the cross-linked, insoluble dextrane. Consequently, the solution withdrawn through the outlet pipe 19 is a xanthine oxidase solution containing the phosphate buffer solution (0.1 M, pH 7.0) as a solvent, which is separated at the interface $N_2$. Further, the cross-linked, insoluble dextrane settled at the bottom of the first compartment 13 is transported upwards by the carrier-circulating mechanism 25 provided in the second compartment 14 through the connection 16, and the dispersing liquid is exchanged from the aqueous sodium chloride solution (1.0 M) to water when the carriers pass through the interface $N_4$. Then, the cross-linked, insoluble dextrane dispersed in water is transported to the starting point of the first compartment through the connection pipe 15. In the state where the carriers of cross-linked, insoluble dextrane are circulated, a phosphate buffer solution (0.1 M, pH 7.0) is charged at a flow rate of $V_{18}$ per unit time into the vessel through the inlet pipe 18; a xanthine oxidase liquor containing a pyrophosphate buffer solution (0.1 M, pH 8.3) as a solvent and ammonium sulfate at a flow rate of $V_{20}$ through 20, an aqueous sodium chloride solution (1.0 M) at a flow rate of $V_{22}$ through 22; and water at a flow rate of $V_{23}$ through 23, while the liquids are withdrawn at flow rates of $V_{21}$, $V_{19}$, $V_{17}$ and $V_{24}$ per unit time through the outlet pipes 21, 19, 17 and 24, respectively. The solvent of the xanthine oxidase can be continuously exchanged by satisfying the following conditions (2).

$$\left.\begin{array}{c} V_{18} \approx V_{17} \\ V_{20} \approx V_{19} \\ V_{22} \approx V_{21} \\ V_{23} \approx V_{24} \end{array}\right\} \quad (2)$$

When the solvent exchange is carried out by using the cross-linked, insoluble dextrane according to the conventional column chromatography, the amount of a sample to be treated for once is limited and much labor and time are required. Or, the sample is usually diluted with a solvent to twice to three times the original volume. On the other hand, in the embodiment of FIG. 2 of the present invention, the carriers are used in circulation, and the amount of the sample to be treated is limitlessly larger, and all the operation can be carried out automatically. Further, the concentration of the sample is not changed and the desired object can be very readily and efficiently attained in the present invention.

In FIG. 3, another embodiment of an apparatus for carrying out the present method for eluting materials is shown. In the figure, the elements common to those of FIG. 2 have the same identification numerals and symbols as in FIG. 2. Only a difference of the apparatus of FIG. 3 from that of FIG. 2 is a carrier-circulating mechanism 25. That is, a carrier-circulating mechanism 25 of FIG. 3 consists of such rotating members 28–31 as sprockets, rollers, etc., such an endless member 32 engaged with said rotating members as a chain, belt, etc., scraper buckets 33 fixed to said endless member at suitable distances, as baskets, hooks, etc., and an electric motor. The upper return-bend part of the endless member 32 is extended to the upper end of the first compartment 13. The electric motor (not shown in the drawing) is to drive the endless member 32.

It is obvious that the circulation of the carriers is possible in the apparatus of FIG. 3 in the same manner as in FIG. 2. The working principle of the apparatus as shown in FIG. 3 is substantially same as that of FIG. 2, and thus will not be explained any more hereunder.

Figure 4:
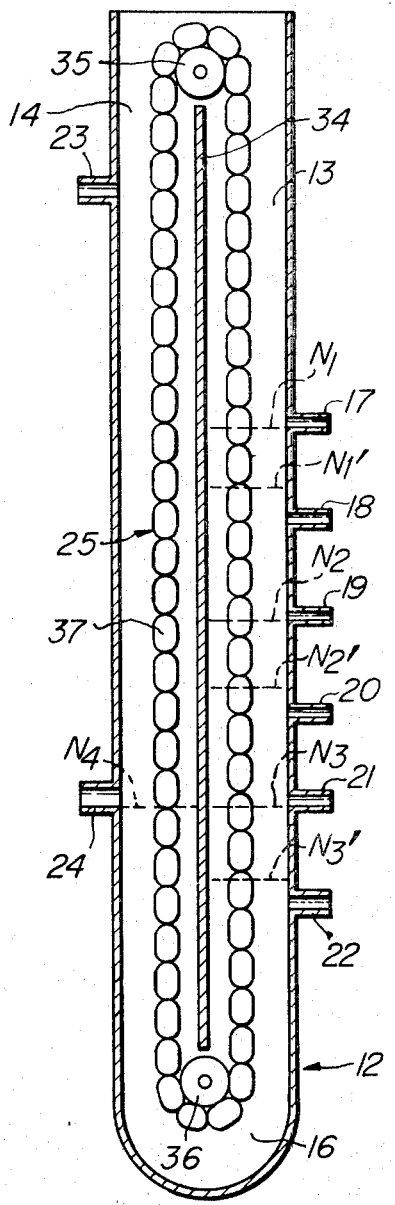
FIG. 4 is a schematic, cross-sectional, elevation view of still further embodiment of the apparatus.

In FIG. 4, another embodiment of an apparatus for carrying out the present method is illustrated, where the same elements as sohwn in FIG. 2 have the same identification numerals and symbols. The embodiment shown in FIG. 4 differs from those of FIGS. 2 and 3 in a carrier-circulating mechanism 25. That is to say, the carrier-circulating mechanism 25 of FIG. 4 consists of such rotating members 35 and 36 provided at the upper and lower ends of a partition wall 26 as sprockets, rollers, etc., and carrier 37 engaged with said rotating members in an endless state so as to be circulated through both compartments by means of such endless element as chain, belt, etc., or not. The working principle of the apparatus as shown in FIG. 4 is substantially same as those of FIGS. 2 and 3, and thus will not be explained any more hereunder. In the apparatus as shown in FIG. 4, there is such an advantage over those of FIGS. 2 and 3, that not only the rising speed, but also the descending speed of the carriers 37 can be freely adjusted.

Throughout FIGS. 1 to 4, materials for a vessel, a cylinder or a liquid tank for containing the liquids, can be such transparent materials as transparent plastic resin, transparent glass, etc. These transparent materials are preferable, because the inside operational state can be visually observed.

What is claimed is:

1. A method for eluting materials, which comprises forming at least one interface between at least two kinds of liquids and passing a carrier consisting of a porous material having cross-linked pores through said interface from one towards the remainder of said at least two kinds of the liquid, there being flow resistances between the materials to be separated present in said remainder of said at least two kinds of the liquids and said cross-linked pores, thereby said materials to be separated present in said other liquid being separated owing to the difference in said flow resistances.

2. A method for eluting materials, which comprises forming a plurality of interfaces between a plurality of liquids and passing a carrier consisting of a porous material having cross-linked pores through said interfaces within said liquids, there being flow resistances between the materials to be separated in said liquids and said cross-linked pores, thereby said materials to be separated present being separated owing to the differences in said flow resistances.

3. A method for eluting materials, which comprises forming at least one interface between at least two kinds of liquids and allowing a carrier consisting of a porous material having cross-linked pores to settle through said interface from said one liquid towards the remainder, there being flow resistances between the materials to be separated in said remaining liquid and said cross-linked pores, thereby said materials to be separated being separated owing to the differences in said flow resistances.

4. A method according to claim 3, which further comprises withdrawing said remaining liquid containing said separated materials and making up the same liquid as said remaining liquid by an amount substantially equal to that of the withdrawn liquid.

5. A method for eluting materials, which comprises filling at least two kinds of liquids into a first vessel to form at least one interface between these two liquids, filling at least two kinds of liquids into a second vessel to form at least one interface between these two liquids, the bottom end of the second vessel being communicated with said first vessel, settling a carrier consisting of a porous material having cross-linked pores from one to the remainder liquid of said two kinds of the liquids in the first vessel through said interface in the first vessel, passing the carrier settled in said first vessel upwardly from one towards the remainder of said two kinds of the liquids in the second vessel through said interface in said second vessel, said cross-linked pores being provided with flow resistances to the materials to be separated present in respective vessels, and returning the carrier, which has passed upwardly through said second vessel, to the one liquid in said first vessel, thereby said materials to be separated being separated owing to the differences in said flow resistances.

6. An apparatus for eluting materials which comprises a first vessel in which at least two kinds of liquids are filled to form at least one interface between these two liquids; a second vessel in which at least two kinds of liquids are filled to form at least one interface between these two liquids; a passage which communicates the bottom end of said first vessel with the bottom end of said second vessel; a carrier-circulating means which transfers a carrier consisting of a porous material having cross-linked pores through said first vessel from the top to the bottom, further transfers the carrier transferred to the bottom of the first vessel through said passage and further through said second vessel from the bottom to the top, and further transfers the carriers transferred to the top of said second vessel to said first vessel, said cross-linked pores having flow resistances to the materials to be separated present in both said vessels, whereby the carrier is circulated through said first vessel, said passage and said second vessel, thereby said materials to be separated being separated owing to the differences in said flow resistances, said carrier-circulating means containing a screw pump in said second vessel for transferring said carrier from the bottom of said second vessel to said first vessel by way of the top of said second vessel.

7. An apparatus for eluting materials which comprises a first vessel in which at least two kinds of liquids are filled to form at least one interface between these two liquids; a second vessel in which at least two kinds of liquids are filled to form at least one interface between these two liquids; a passage which communicates the bottom end of said first vessel with the bottom end of said second vessel; a carrier-circulating means which transfers a carrier consisting of a porous material having cross-linked pores through said first vessel from the top to the bottom, further transfers the carrier transferred to the bottom of the first vessel through said passage and further through said second vessel from the bottom to the top, and further transfers the carriers transferred to the top of said second vessel to said first vessel, said cross-linked pores having flow resistances to the materials to be separated present in both said vessels, whereby the carrier is circulated through said first vessel, said passage and said second vessel, thereby said materials to be separated being separated owing to the differences in said flow resistances, said carrier including a plurality of carrier units, said carrier-circulating means containing a means for connecting said carrier units to one another in an endless state, which circulates through the first and second vessels, and a means for driving said endless carriers.

8. An apparatus for eluting materials which comprises a first vessel in which at least two kinds of liquids are filled to form at least one interface between these two liquids; a second vessel in which at least two kinds of liquids are filled to form at least one interface between these two liquids; a passage which communicates the bottom end of said first vessel with the bottom end of said second vessel; a carrier-circulating means which transfers a carrier consisting of a porous material having cross-linked pores through said first vessel from the top to the bottom, further transfers the carrier transferred to the bottom of the first vessel through said passage and further through said second vessel from the bottom to the top, and further transfers the carriers transferred to the top of said second vessel to said first vessel, said cross-linked pores having flow resistances to the materials to be separated present in both said vessels, whereby the carrier is circulated through said first vessel, said passage and said second vessel, thereby said materials to be separated being separated owing to the differences in said flow resistances, said carrier circulating means including an endless member arranged along an endless path which is extended in a direction substantially perpendicular to said interface in said second vessel within it and is projected in a part thereof from the top of said second vessel to said first vessel, means for driving said endless member along said endless path, and scraper buckets disposed on said endless member for carrying said carrier from the bottom of said second vessel to said first vessel through the top of the second vessel on the basis of the movement of said endless member along said endless path.

9. A method for eluting materials which comprises forming at least one substantially horizontal interface between at least two kinds of liquids, the liquid immediately below said at least one interface including the materials to be separated having different flow resistances relative to the passage of a porous material having cross-linked pores, and passing downwardly under the influence of gravity a carrier consisting of said porous material having cross-linked pores through said interface, whereby said materials to be separated are separated into vertically disposed zones due to said different flow resistances.

10. A method according to claim 9 wherein the only change in position of said at least one interface is due to the effect of the movement of said porous material having cross-linked pores.

11. A method according to claim 9 which further comprises withdrawing from at least one of said vertically disposed zones a portion of the liquid therein containing at least one of the separated materials and replacing the same with an equal amount of said liquid immediately below said at least one interface.

12. An apparatus for eluting materials which comprises a first vessel in which at least two kinds of liquids are disposed to form at least one horizontal interface therebetween, the liquid immediately below said interface including materials to be separated having different flow resistances relative to the movement of a porous material having cross-linked pores; a second vessel including at least one liquid therein; a lower passageway communicating between the bottom ends of said vessels; an upper passageway communicating between the tops of said vessels; a carrier circulating means for transferring said porous material having cross-linked pores from the bottom end of said first vessel through said lower passageway, said second vessel and said upper passageway to the top of said first vessel whereupon said porous material settles by gravity to the bottom of said first vessel thereby effecting the separation of said materials to be separated in vertical zones; first outlet means communicating between the interior and exterior of said first vessel arranged to withdraw at least one of the separated materials and the accompanying liquid from at least one of said vertical zones; first inlet means disposed below said outlet means arranged to permit the supplying of said liquid immediately below said interface to make up for the liquid withdrawn; second inlet means associated with the top of said second vessel for injecting therein a dispersing liquid for said porous material; second outlet means positioned below said second inlet means for removing the solution in the bottom of said vessels; third inlet means positioned above said first outlet means for adding the liquid of the kind immediately above said at least one interface; third outlet means disposed above said third inlet means for removing said dispersing liquid; fourth inlet means disposed below said first inlet means for supplying the solution found at the bottom of said vessels; and fourth outlet means disposed between said first and fourth inlet means for removing the liquid, including those materials which have migrated due to the effect of said porous material, which are located in this region of said vessel.

13. A process for eluting materials comprising:
initially forming at least one fixed, substantially horizontal interface between at least two kinds of liquids, the liquid immediately below said interface containing at least two separable materials, at least one of said separable materials having a reltively high flow resistance relative to a porous material having cross-linked pores and at least another of said separable materials having a relatively low flow resistance relative to said porous material, passing a carrier of said porous material downwardly through said interface from the liquid on the upper side to that on the lower side thereof, whereby said at least one of said separable materials having a relatively high flow resistance moves downwardly leaving at least one elution zone containing said at least one of said separable materials having a relatively low flow resistance and being substantially free from said at least one of said separable materials having a relatively high flow resistance.

14. A process according to claim 13 wherein said at least one of said separable materials having a relatively low flow resistance is a material whose molecular size precludes passage through the cross-linked pores of said porous material.

15. A process according to claim 13 wherein elution is carried out continuously by continuously and laterally removing the separated materials and accompanying liquid from each of the formed elution zones and replacing the removed liquids and separable materials in a manner such that all interfaces remain in substantially fixed steady state positions.

References Cited
UNITED STATES PATENTS 3,002,823    10/1961    Flodin et al.    210—31 X
3,493,497    2/1970    Pretorius et al.    210—198 X JOHN ADEE, Primary Examiner U.S. Cl. X.R.

210—198 C